Dec. 2, 1930.  J. C. CROWLEY  1,783,327
VALVE INSIDES
Filed Nov. 13, 1929
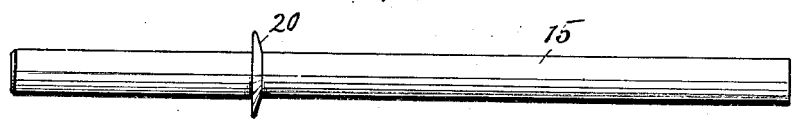
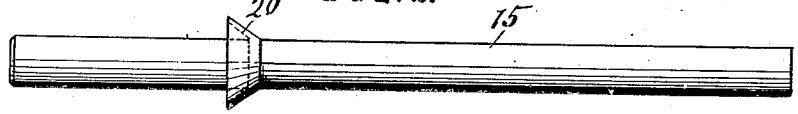
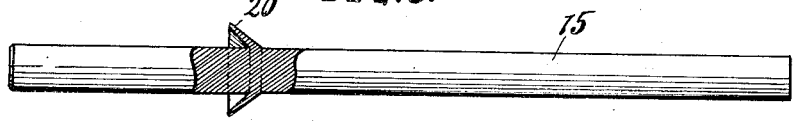
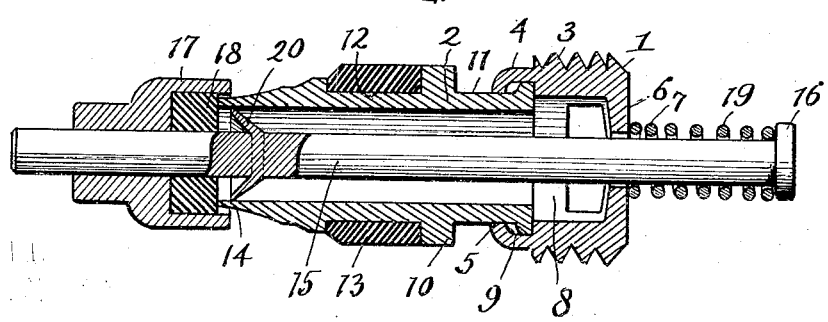
INVENTOR
JOHN C. CROWLEY.
Kuris Hudson & Kent.
Attorneys.

Patented Dec. 2, 1930

1,783,327

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE INSIDES

Application filed November 13, 1929. Serial No. 406,767.

The present invention relates to valve insides which, as is well known, are intended to be inserted within a valve stem commonly used in connection with air inflated tubes, such as inner tubes for automobile tires and the like.

An object of the present invention is to provide a valve insides wherein the air passageways through the stem are of a maximum size.

Another object is to provide a valve insides, the valve pin of which is materially smaller in diameter than are the valve pins ordinarily used in valve insides, thus increasing the size of the air passageways through the insides.

A further object is to provide a valve pin for use in a valve insides which is so formed that it may be economically manufactured and which when finished is of a minimum diameter.

Additional objects and advantages will appear hereinafter.

Reference should be had to the accompanying drawings forming a part of this specification in which—

Fig. 1 is an elevational view of the valve pin during one period of its manufacture;

Fig. 2 is an elevation of the valve pin during another period of its manufacture;

Fig. 3 is a view similar to Fig. 2, the portion of the pin having the enlargement being shown in section; and Fig. 4 is a longitudinal sectional view through the valve insides, the valve pin being shown partly in elevation and partly in section.

In the present disclosure it will be understood that the valve insides are intended, primarily, for use in connection with the standard and usual form of valve stem which is, at present, used in connection with inner tubes for tires, although the use of the valve insides is not restricted to this precise application or use. The standard valve stem needs no description on account of its universal use but it may be stated that the standard valve stem has an inner bore which is threaded at the outer end thereof for the purpose of receiving threads upon a valve insides. The bore of the valve stem is provided at a short distance from the threaded end of the stem with a reduced portion which forms a shoulder against which a suitable packing member on the valve insides engages, for the purpose of effecting an air-tight seal and thereby preventing the escape of air around the body of the valve insides.

As shown in Fig. 4, the body of the valve insides is formed of two parts, namely, part 1 and part 2. The part 1 is provided with exterior threads 3 and has adjacent its lower end a downwardly extending flange 4 provided with an inturned part 5. The part 1 has a narrow bridge portion 6 extending diametrically across the same and provided with a central opening 7 communicating with a bore 8 within the part 1. This construction is well known and need not be described herein in further detail. The other part of the body member is formed adjacent its upper end with an outturned flange 9 spaced from another outwardly extending flange 10 whereby an annular recess 11 is provided between the flanges 9 and 10 which recess receives the inwardly extending part 5 of the flange 4 of the body member part 1. This arrangement effects a swivel connection between the two parts of the body member with the result that the part 2 may be inserted into a valve stem and forced longitudinally into proper position therein by the rotation of the part 1, the exterior threads 3 of which engage the interior threads of the valve stem. In other words, the part 2 merely has an axial movement into the valve stem while the part 1 is positioned therein by rotating movement. Beyond the flange 10 a recess 12 is formed in the body member for the purpose of receiving a suitable packing member 13 which cooperates with the valve stem to form an air-tight connection. The lower end of the part 2 is externally tapered so that the lower edge of such part, indicated at 14, forms a relatively narrow valve seat. A valve pin, indicated at 15, extends through the body member of the insides and has at its upper end an annular head 16 while its lower end is connected to a valve member proper 17 provided with packing 18 and adapted to seat on the valve seat 14. A spring 19 surrounds the valve pin between the bridge 6 and the head 16 and normally maintains the valve proper upon its seat. Valve pins used in valve insides are usually formed with an enlargement adjacent the valve proper for the purpose of assisting in guiding the pin in its movements to seat and unseat the valve proper. When the valve pin is depressed to unseat the valve proper the enlargement engages the edge of the valve seat of the body member and guides the pin in its movement. Ordinarily, the enlargement on the valve pin is formed integrally with the pin and comprises a solid frusto-conically shaped portion of substantial size. In order to provide sufficient material for the enlargement it has been necessary to use relatively thick stock in forming the valve pin and this has resulted in increasing the cost of the same and also in reducing the size of the air passageways through the insides because of the large diameter of the valve pin. The present invention proposes the formation of a valve pin in such a manner that relatively thin stock may be used and a consequent reduction in the cost of the pin and an increase in the size of the air passageways through the valve insides obtained. To this end the relatively thin stock is drawn through suitable dies so as to form thereon a relatively thin outstanding flange 20, as shown in Fig. 1. After this flange has been formed on the stock the flange is then spun by any suitable means into the form shown in Figs. 2 and 3 and when in this form comprises a hollow frusto-conically shaped member integrally formed on the valve pin and of such size that its lower circumferential edge will contact with the wall of the bore of the body member of the insides and when the pin is depressed to unseat the valve it will guide the pin in its movements. It will be seen that the formation of the enlargement upon the valve pin in this manner may be expeditiously carried out and does not prevent the use of a valve pin of a relatively small diameter.

Although a preferred embodiment of the invention has been illustrated and described herein it should be understood that the same is susceptible of various modifications and adaptations within the scope of the appended claims.

Having thus described my invention, what I claim is:

1. A valve pin for use with a valve insides and having an enlargement formed thereon and adapted to lie adjacent the valve proper carried by the pin, said enlargement comprising a cup-like portion integrally formed on said pin and surrounding the same.

2. A valve pin for use with a valve insides and having an enlargement formed thereon and adapted to lie adjacent the valve proper carried by the pin, said enlargement comprising a hollow frusto-conical portion integral with said pin.

In testimony whereof, I hereunto affix my signature.

JOHN C. CROWLEY.